United States Patent [19]

Kline et al.

[11] Patent Number: 4,546,621

[45] Date of Patent: Oct. 15, 1985

[54] CRYOGENIC DETECTOR POST

[75] Inventors: Mark L. Kline, Fullerton; Oakley G. Ross, Upland, both of Calif.

[73] Assignee: General Dynamics, Pomona Division, Pomona, Calif.

[21] Appl. No.: 600,069

[22] Filed: Apr. 13, 1984

[51] Int. Cl.[4] ............................................. F25B 19/00
[52] U.S. Cl. .................................. 62/514 R; 165/47; 165/185; 250/352; 250/370
[58] Field of Search ......... 62/514 R; 250/352, 370 L; 165/47, 185

[56] References Cited

U.S. PATENT DOCUMENTS

| | | | |
|---|---|---|---|
| 2,708,832 | 5/1955 | McGregor | 165/185 |
| 3,258,602 | 6/1966 | Promish | 62/514 R |
| 3,654,377 | 4/1972 | Fleming et al. | 62/514 R |
| 3,692,095 | 9/1972 | Fleming | 62/6 |

Primary Examiner—Ronald C. Capossela
Attorney, Agent, or Firm—Neil F. Martin; Edward B. Johnson

[57] ABSTRACT

A cooled infrared detector post includes a detector post formed of a stack of wafer disks with a detector substrate wafer forming one end of the post and a cooling chamber adjacent to the detector substrate with coolant supply and return passages formed in the series of wafers with a supply passage contained to a supply port with a supply passage forming a plurality of serpentine passages at various planes within the post and a return passage including a plurality of precooling chambers with the wafer stacked in a predetermined arrangement and fused together to form a monolithic post structure.

10 Claims, 9 Drawing Figures

CRYOGENIC DETECTOR POST

BACKGROUND OF THE INVENTION

The present invention relates to an infrared detector cooler and pertains particularly to an improved infrared detector and cooling system.

Many sensing elements, particularly infrared detectors and the like, require cooling in order to maintain the efficiency of the detector and improve the noise to signal ratio of the detector unit. Many Joule-Thompson effect gas coolers have been used in the past for the cooling of infrared detectors. Previous devices of this type have been typically constructed of metallic capillary tubing wrapped in a cylindrical fashion to cause a pressure drop and precool the incoming gas to the detector. Such infrared detector devices typically require a fast cool down to a temperature of approximately minus 100° centigrade and a maintenance of a fairly stable temperature over the operating period. This provides maximum detector sensitivity and efficiency.

The prior art metallic tube arrangement has a number of drawbacks including its susceptibility to electrical magnetic interference from adjacent sources.

It is desirable that an improved cryogenic detector post be available.

SUMMARY AND OBJECTS OF THE INVENTION

It is the primary object of the present invention to provide an improved cryogenic detector post.

In accordance with the primary aspect of the present invention, a detector post having infrared sensor means on one end thereof includes a cooling chamber adjacent to the sensing substrate with the post made up of a plurality of wafers having passageways formed therein and stacked to form a desirable passageway characteristic and fused together to form a monolithic post structure.

BRIEF DESCRIPTION OF THE DRAWINGS

The above and other objects and advantages of the present invention will become apparent from the following description wherein.

DETAILED DESCRIPTION OF THE PREFERRED EMBODIMENT

Figure 1:
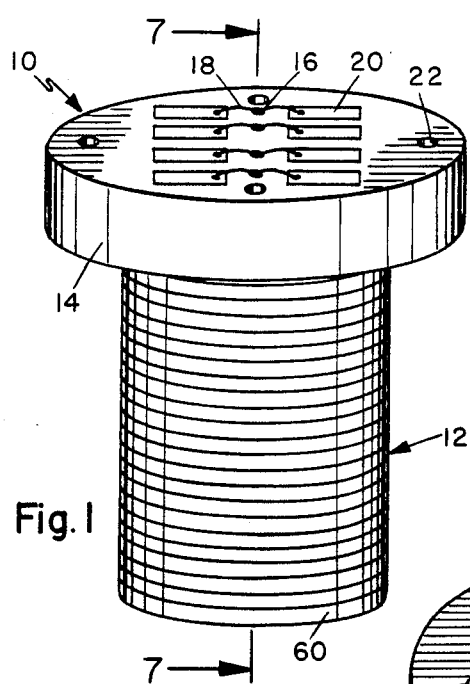
FIG. 1 is a perspective view of the cryogenic detector post.
Figure 2:
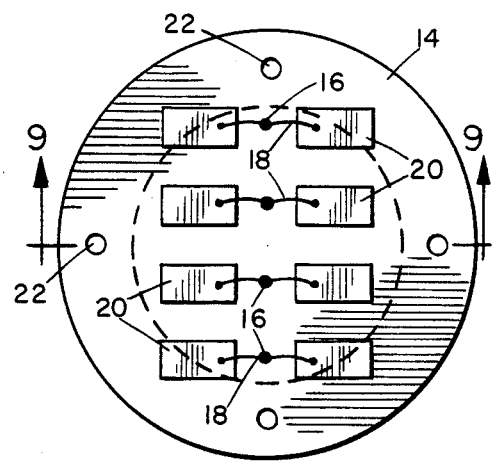
FIG. 2 is a top plan view thereof.

Referring to FIG. 1, a cryogenic detector post in accordance with the invention is illustrated and designated generally by the numeral 10. This detector post comprises a generally cylindrical body or post member 12 having a detector cap 14 mounted on one end thereof defining a substrate on which is deposited or mounted a plurality of detector elements 16. The detector elements 16 are formed or mounted on the cap or substrate 14 in a suitable pattern or array and connected by suitable detector leads 18 to respective connector or bonding pads 20 for connecting to preamp leads and the like.

The detector post unit is made up of a plurality of wafer disks of a nonconductive but fusible material stacked together and fused to form a monolithic structure. Each of the disks are formed with a certain portion of either the inlet or outlet passageway and cooling chambers and the like to permit the construction of a suitable detector post unit. A plurality of bores 22 are formed in the cap 14 to receive mounting bolts or screws for mounting the unit.

Figure 3:
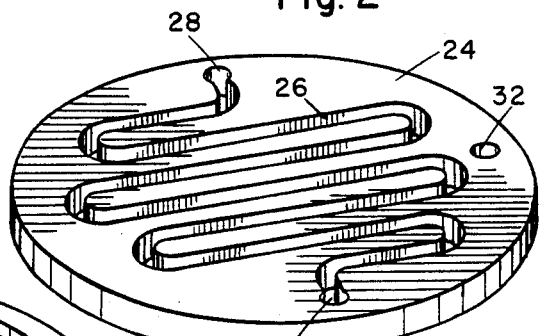
FIGS. 3 through 6 are enlarged perspective views of the basic types of wafers which are stacked to form the post.

Referring to FIG. 3, each of the wafers has the basic form of a circular disk with various configurations of passageways or the like formed therein such that when the wafers are selectively stacked the desired configuration of passageways, cooling chambers, etc. throughout the post are obtained.

Referring to FIG. 3, a wafer 24 is disclosed which may be referred to as a passageway wafer and is formed on one surface thereof with a serpentine-like passageway 26 connecting a pair of ports 28 and 30 on opposite lateral sides of the wafer adjacent the peripheral edge thereof. This serpentine groove or passageway is closed by the flat side of an adjacent wafer thereby forming a passageway. A through port or passage 32 extends through from one face to the opposite face of the wafer 24.

Figure 4:
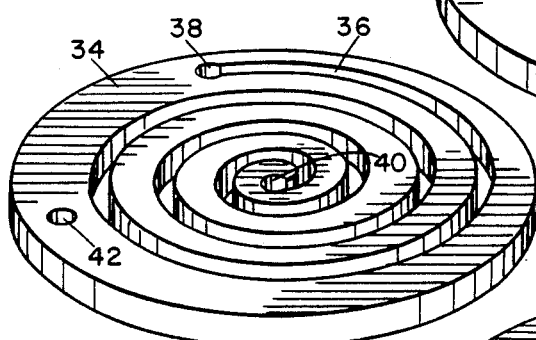

Referring to FIG. 4, a wafer 34 is formed with a spiral passageway 36 which communicates between an outer port 38 adjacent an outer peripheral edge thereof and a central port 40 at the center of the wafer or disk. This permits the communication of the coolant fluid to a central position for a communication to the center of an expansion chamber or the like. It can also be used to convey the coolant fluid from a central position to an outer position for alignment or communication with a through passage. A through port or passage 42 communicates between opposite faces of the disk.

Figure 5:
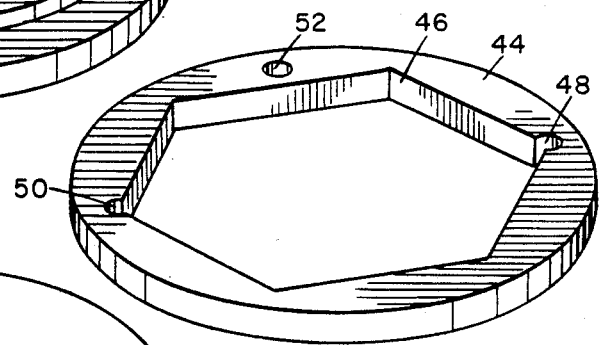

Referring to FIG. 5, a disk 44 is provided with a central cavity or opening extending completely through from one face to the other of the disk which may be referred to as an expansion cavity. This cavity in the illustrated embodiment has a generally hexagonal configuration and communicates at the outer edges with ports 48 and 50 and includes a through port or passage 52.

Figure 6:
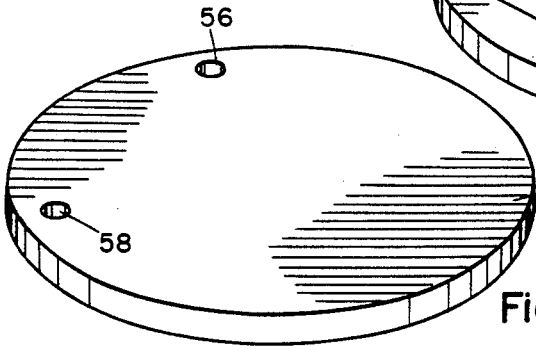

Referring to FIG. 6, a wafer 54 is formed of opposing generally flat plane surfaces, but with a plurality of ports 56 and 58 at or adjacent the outer peripheral edges thereof for alignment with similar ports on other wafers.

Figure 7:
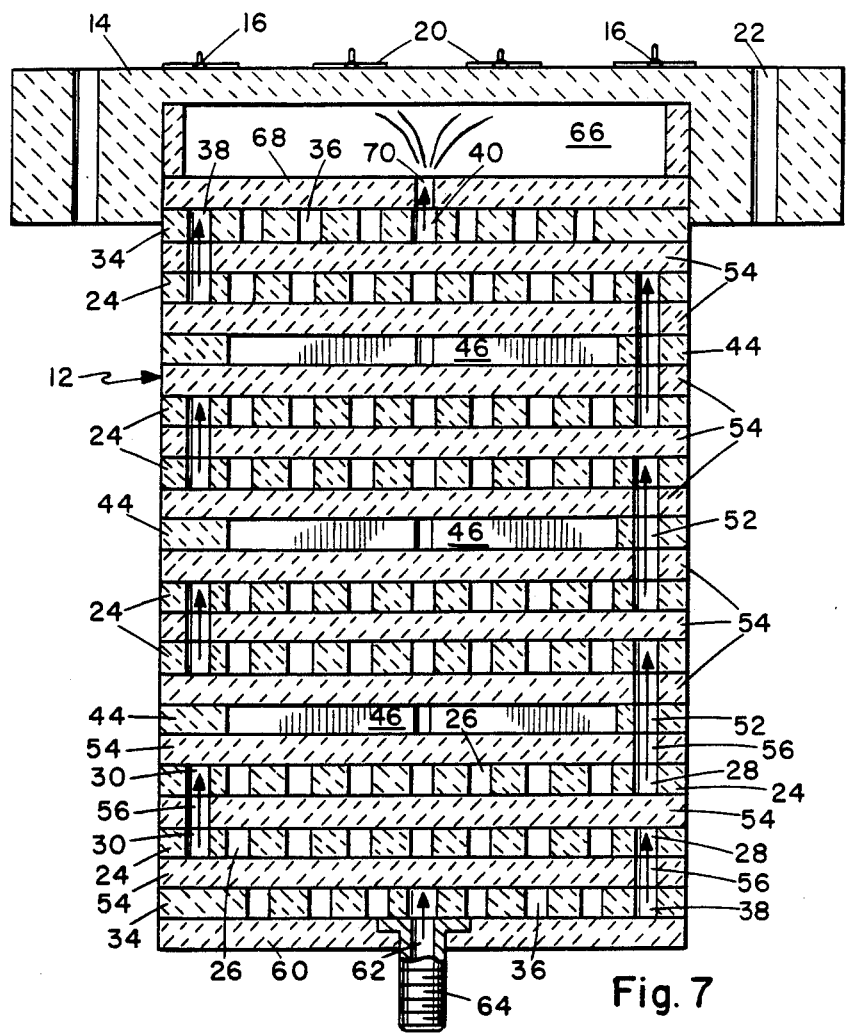
FIG. 7 is an enlarged sectional view taken on line 7—7 of FIG. 1.
Figure 8:
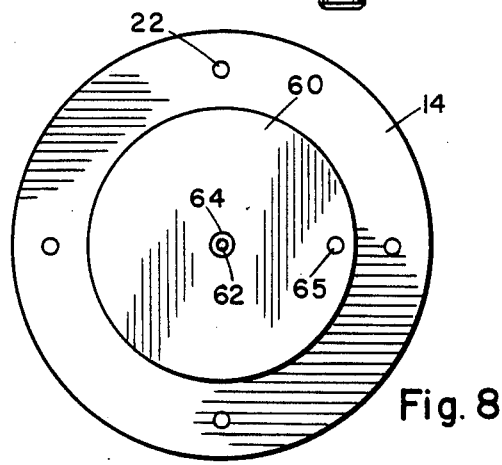
FIG. 8 is a bottom plan view of the post.

Referring to FIG. 7, there is illustrated in cross section a detector post in accordance with the invention showing the various wafers selected and arranged to provide a structure in accordance with the invention. A bottom wafer or cap 60 includes a central inlet port 62 formed such as by a suitable coupling 64 for attachment to a source of high pressure gas, and an outlet port 65 near the peripheral edge.

Figure 9:
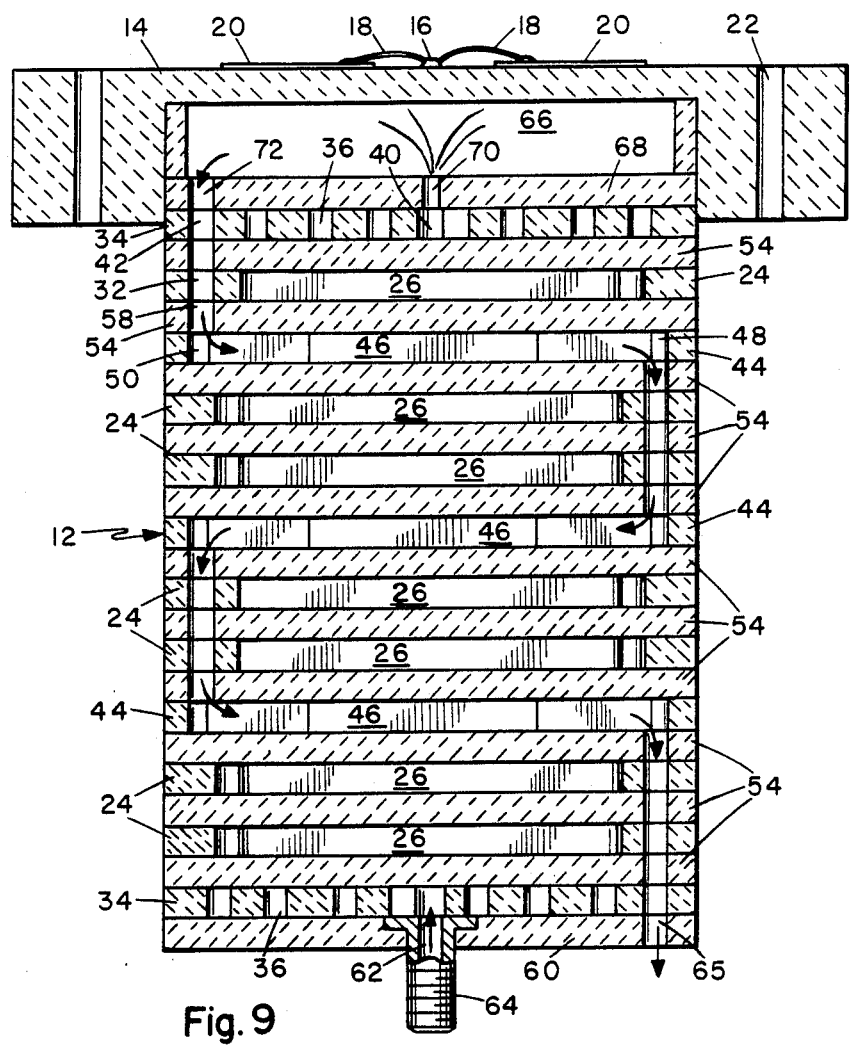
FIG. 9 is an enlarged sectional view taken on line 9—9 of FIG. 2.

The detector end or cap 14 is formed with a generally cylindrical cavity 66 forming the expansion cavity wherein the compressed gas flashes to a liquid for cooling the cryostat. This chamber is generally cylindrical in form and enclosed by means of a circular disk 68 having a centrally located inlet nozzle 70 and an outlet port 72 (FIG. 9). This provides the cooling chamber directly at the back of substrate forming the area on which the detector elements are placed or mounted.

In operation with reference to FIG. 7, a supply of compressed gas such as nitrogen or a suitable refrigerant is introduced into inlet port 62 where it passes into or communicates with a port 40 of a centering disk 34, out the spiral passageway 36 to port 38 which mates with a port 56 of a spacer disk 54 and passes therethrough into a port 28 of a passage disk 24, passing along the serpentine passageway 26 to an outlet port 30, communicating through a port 56 of another spacer disk 54 into a port 30 of another passage disk 24, passing along the serpentine passage 26 thereof to port 28, passing again through a port 56 of another spacer disk 54 through passage 52 of an expansion cavity disk 44, through a port in a disk 54 and in a similar fashion passing through similarly repetitive stacks of wafers to a top locate centering disk 34 located adjacent the disk 68, which transmits the compressed gas along the spiral passageway from the outer port 38 of disk 34 to the center port 40, where it communicates with the inlet nozzle 70 which conveys the gas into the expansion cooling chamber 66. The gas passing into the chamber 66 flashes to a liquid thus cooling the cap or substrate 14.

The liquid then follows a return passageway as shown in FIG. 9, passing through the various passages of the disks to the precooling chambers 46 of the series of disks 44 as the liquid passes back through the post to the exhaust port 65. Other possible arrangements for inlet and outlet or supply and exhaust passages are possible. The slotted passages within the wafers have the characteristic of being very rough surfaced. This is an advantage over smooth surface microtubing because the boundary layer effect on the fluid is increased. Since fluid friction increases with the boundary layer, the required pressure drop can be achieved in a shorter length of passage for obtaining the Joule-Thompson cooling effect.

Once the wafers are stacked correctly in place to achieve the desired passageway, they are fused together into one monolithic structure. This provides a compact very strong structure enabling it to withstand extremely large accelerations such as those experienced in artillery rounds.

Since the detector post is made up of a nonconductive material, electrical magnetic interference from metallic sources in close proximity is eliminated.

While we have illustrated and described our invention by means of specific embodiments, it is to be understood that numerous changes and modifications may be made therein without departing the spirit and scope of the invention as defined in the appended claims.

We claim:
1. A cryogenic detector post, comprising:
   an elongated monolithic body member having a mounting end and a sensing end on which sensors are mounted, said body member being constructed of a plurality of nonconductive wafers stacked together and connected into a unitary structure,
   an inlet port for communicating with a source of high pressure gas;
   an outlet port for exhausting gas;
   a cooling chamber at said sensing end; and
   said wafers having interconnecting passageway means formed therein for communicating said inlet port with said cooling chamber along a gas supply path and communicating said cooling chamber with said outlet port along a gas return path.
2. A cryogenic detector post according to claim 1 wherein:
   said sensing end is defined by a generally circular plane surface; and
   said cooling chamber has a generally circular configuration.
3. A detector post according to claim 2 wherein said sensing end is defined by a circular nonconductive wafer.
4. A detector post according to claim 3 wherein said cooling chamber is formed in said wafer.
5. The detector post of claim 4, wherein said passageway means defining said supply path includes a plurality of serpentine passages formed at various planes within the post to direct said gas along serpentine paths at each of said planes perpendicular to the longitudinal axis of said post.
6. The detector post of claim 5, wherein said serpentine paths are formed in selected ones of said wafers, said selected wafers having serpentine grooves formed across their faces, and the wafers interposed between said selected wafers having passageway means arranged to interconnect opposed ends of said serpentine grooves from one selected wafer to the next throughout said supply path.
7. The detector post of claim 4 wherein said passgeway means includes outlet passageway means including a plurality of precooling chambers.
8. The detector post of claim 1, wherein said passageway means are formed in said individual wafers prior to fusing.
9. The detector post of claim 1 wherein said post is of a generally cylindrical configuration.
10. A cryogenic detector post, comprising:
    an elongated monolithic body member having a mounting end and a sensing end on which sensors are mounted;
    said body member comprising a plurality of nonconducting wafers stacked one on top of each other and fused into a unitary structure;
    said body member having an inlet port for communicating with a source of high pressure gas and an outlet port for exhausting gas;
    said wafers being formed with passageway means prior to fusing for providing separate inlet and outlet paths for gas, said inlet path communicating said inlet port with said cooling chamber and said outlet path communicating said cooling chamber with said outlet port; and
    selected ones of said wafers having serpentine grooves formed across their faces for providing a plurality of serpentine passages at various planes within said post in said inlet path.

* * * * *